(No Model.)
U. R. MOHR.
MIXER.
No. 530,051. Patented Nov. 27, 1894.
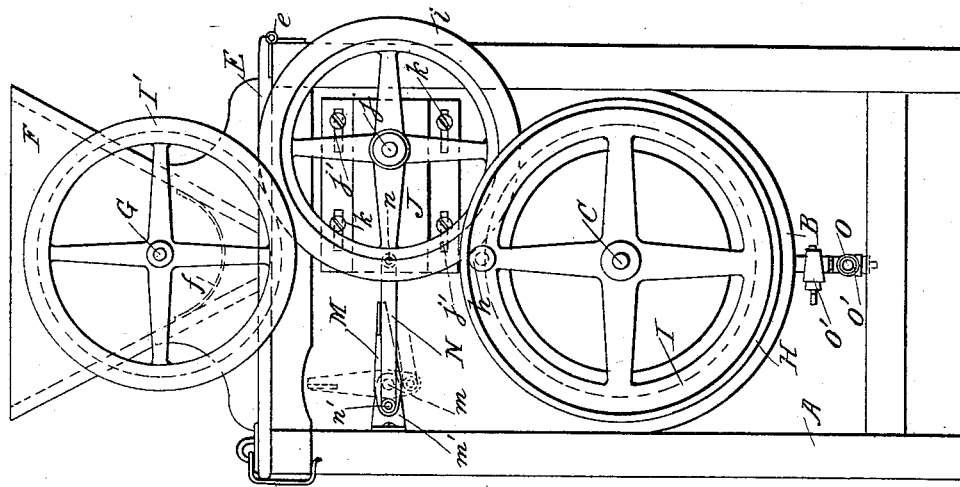
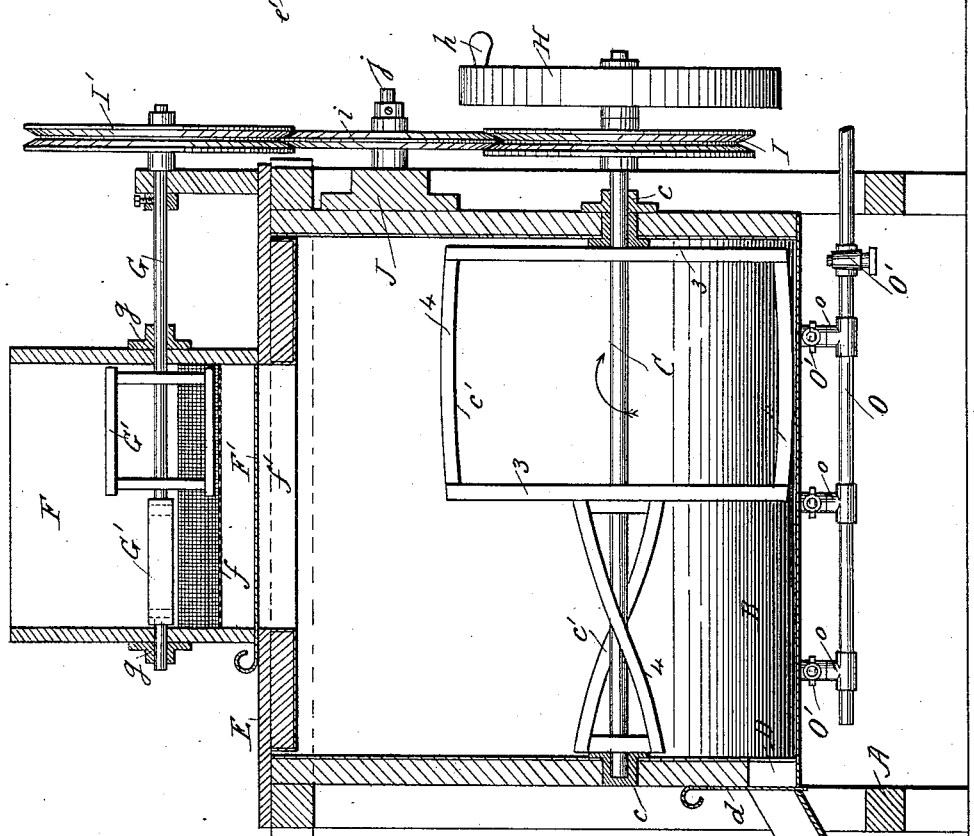
WITNESSES.
Herbert W. Jenner
Wm. J. Fahnestock
INVENTOR
Ulrick R. Mohr.
BY
ATTORNEY.

United States Patent Office.

ULRICK R. MOHR, OF ROCK ISLAND, ILLINOIS, ASSIGNOR OF ONE-HALF TO JAMES B. MORGAN, OF DAVENPORT, IOWA.

MIXER.

SPECIFICATION forming part of Letters Patent No. 530,051, dated November 27, 1894.

Application filed June 11, 1894. Serial No. 514,162. (No model.)

*To all whom it may concern:*

Be it known that I, ULRICK R. MOHR, a citizen of the United States, residing at Rock Island, in the county of Rock Island and State of Illinois, have invented certain new and useful Improvements in Mixers; and I do hereby declare the following to be a full, clear, and exact description of the invention, such as will enable others skilled in the art to which it appertains to make and use the same.

This invention relates to machines for mixing paste, paint and other similar materials; and it consists in the novel construction and combination of the parts hereinafter fully described and claimed.

In the drawings: Figure 1 is a longitudinal section through the mixer; and Fig. 2 is an end view of the mixer.

A is a frame which rests on the ground, and supports a mixing tank B having a semi-cylindrical bottom.

C is a shaft journaled in bearings $c$ secured to the ends of the tank, and $c'$ are two beaters secured upon the said shaft inside the tank. The tank is provided with an outlet D at one end, and is provided with any approved regulating device, such as the slide $d$, for letting out the contents of the tank. Each beater $c'$ preferably consists of arms 3 secured on the shaft C, and provided with spirally arranged crosspieces 4 secured to their ends. The two beaters are arranged at right angles to each other, and the crosspieces agitate the material in the tank, scrape the bottom of the tank, and work the material endwise toward the outlet D.

E is the lid of the tank, hinged to the frame on one side by the hinges $e$, and provided with hooks $e'$, or other equivalent fastening devices, on the other side, for securing it in position.

F is a hopper secured to the top of the lid E, and $f$ is a sieve arranged between the hopper and the tank.

F′ is a slide under the sieve, for controlling the passage of material through the aperture $f'$ into the tank.

G is a shaft journaled in the bearings $g$ secured to the ends of the hopper.

G′ are arms secured on the shaft G inside the hopper, for agitating its contents.

H is a belt pulley secured on the end of the shaft C, and $h$ is a handle projecting from the said pulley, so that the machine may be driven by hand or by power. The shafts C and G are operatively connected together by any approved driving mechanism. Toothed wheels, a belt and belt pulleys, a drive chain and chain wheels, or frictional drive wheels may be used, but the preferred driving mechanism is that shown in the drawings. This consists of a friction wheel I secured on the shaft C, a friction wheel I′ secured on the shaft G, and an intermediate friction wheel $i$ connecting the wheels I and I′. The friction wheel $i$ is journaled on a pin $j$ projecting from a sliding bracket J. The bracket J is provided with elongated holes $j'$ which slide upon the bolts $k$, which secure the bracket to the end of the tank.

M is a lever pivoted on the pin $m$, projecting from the bracket $m'$ which is secured to the frame.

N is a rod pivoted to the bracket J by the pin $n$, and to the lever M by the pin $n'$. When the lever M is raised, as shown by the dotted lines in Fig. 2, the wheel $i$ is pushed back out of contact with the wheels I and I′.

O is a steam pipe provided with branches $o$ on the under side of the tank, and O′ are valves for regulating the admission of steam into the tank. A thermometer and a water gage of any approved construction are used to indicate the condition of the contents of the tank.

In making paste, water is placed in the tank, and flour is placed in the hopper. The agitators and beaters are then revolved, and the flour which falls through the sieve into the water is mixed therewith, and all lumps are prevented. The steam is then let into the tank and the paste is cooked thereby, and removed from time to time through the outlet D. When sufficient flour has been added to the water, the friction wheel $i$ is pushed back so that the agitator in the hopper is no longer revolved. The lid can then be raised to permit the paste to cool without stopping the beater shaft in the tank.

When the mixer is used for paint, the steam pipes are not required. When used for mixing or blending several kinds of paint, a series of hoppers can be arranged, one behind the other, on the lid of the mixer. The separate colors are then placed in the different hoppers and are fed into the tank simultaneously and mixed together therein by the beaters.

What I claim is—

1. In a mixer, the combination, with the tank B having a semi-cylindrical bottom, and the two beaters journaled inside the tank and arranged at right angles to each other, each beater consisting of two spirally-arranged crosspieces, operating to scrape the bottom of the tank, and arms supporting the said crosspieces; of the hopper secured to the lid of the tank, the agitators journaled in the hopper, driving mechanism for revolving the beaters and agitators simultaneously, a sieve forming the bottom of the hopper, a regulating slide under the sieve and between it and the tank, and steam pipe connections for cooking the contents of the tank, substantially as set forth.

2. In a mixer, the combination, with the tank provided with a hinged lid, and the beaters journaled in the tank; of the hopper secured to the said lid and provided with agitators, the friction wheels I and I' secured to the beater and agitator shafts, the sliding bracket and the friction wheel $i$, and the pivoted lever M and the rod N for operating the said bracket and placing the friction wheels in contact, substantially as set forth.

In testimony whereof I affix my signature in presence of two witnesses.

ULRICK R. MOHR.

Witnesses:
J. B. MORGAN,
E. F. GUY.